United States Patent Office 3,563,710
Patented Feb. 16, 1971

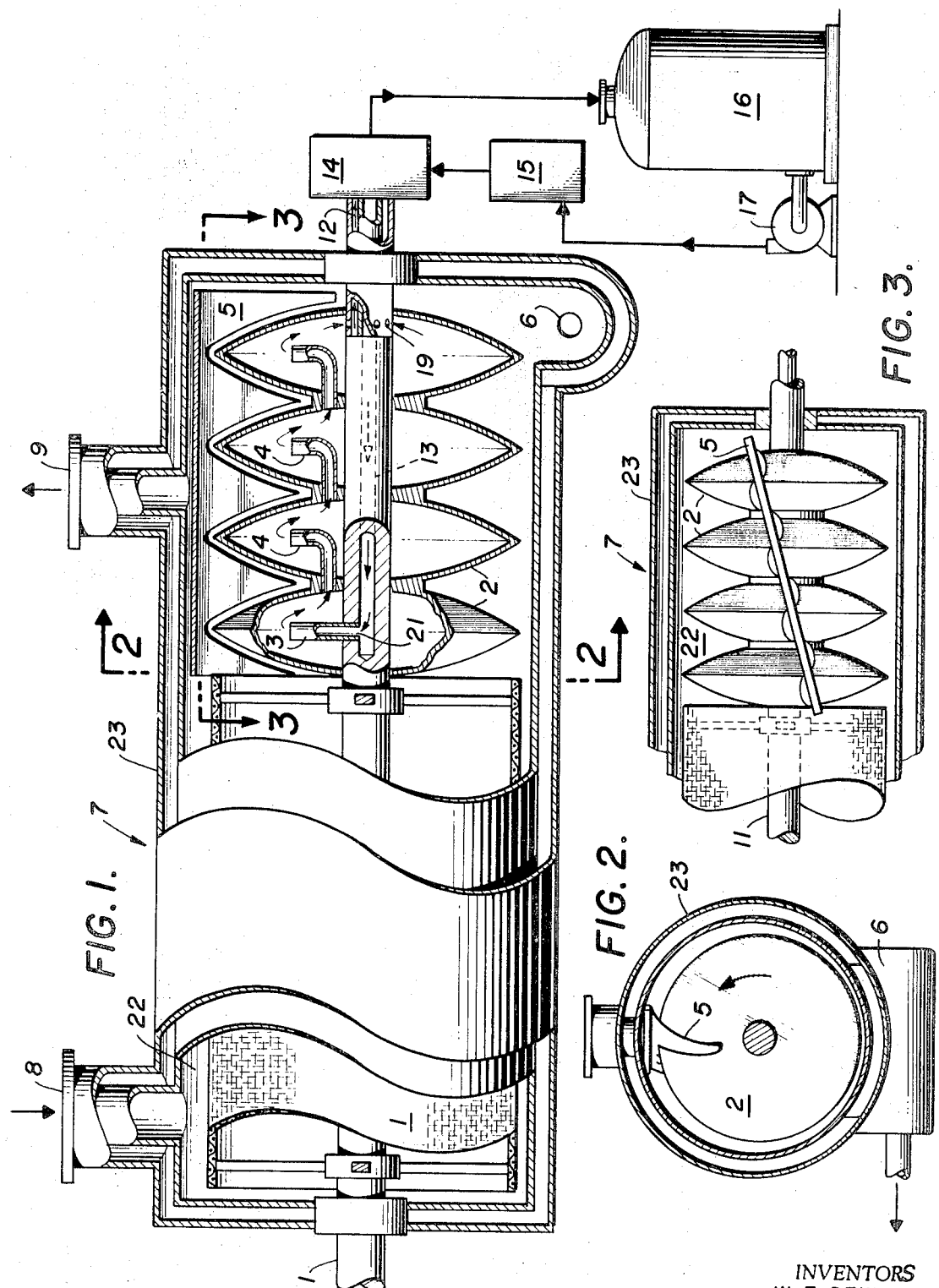

3,563,710
POLYMERIZATION APPARATUS
William F. Dew, Jr., and Allen E. Leybourne III, Decatur, Ala., and Robert E. Colwell, Chapel Hill, N.C., assignors to Monsanto Company, St. Louis, Mo., a corporation of Delaware
Filed Feb. 16, 1968, Ser. No. 705,965
Int. Cl. F28d 11/08
U.S. Cl. 23—285                                  19 Claims

ABSTRACT OF THE DISCLOSURE

A continuous polymerization apparatus specifically constructed to provide for controlled temperature, uniform mixing, and excellent surface generation and film formation, having juxtaposed rotor and stator surfaces with a circulating heat transfer medium therein, thereby providing, in conjunction with heat transfer medium temperature control, means to mix the polymer and to provide finite temperature control of the juxtaposed surfaces as well as means to forward the polymer toward the exit end of the reaction chamber; thereby to produce extremely high viscosity high molecular weight polymers.

BACKGROUND OF THE INVENTION

In the production of polymeric materials by melt condensation polymerization, the polymerization reaction is carried to its completion in what is called a "finisher" wherein volatile by-products are removed in the course of a high temperature mix. In continuous processes such as those used in the production of nylon, the finisher is normally a heated generally cylindrical horizontal vessel. The final polymerization step normally accomplished in these vessels requires extremely high temperatures which vary depending upon the particular polymer composition, the flow rate and the mixing rate. Various means have been devised to provide for uniform flow in the axial direction in order to avoid the degradation of the polymers which occur when they are subjected to high temperatures for extended periods of time. It has thus been sought in the past to provide for a complete reaction with a minimum of heat degradation by carefully regulating the flow of the polymer within the finisher, and sometimes by compartmentalizing the mixing areas within the finisher to avoid irregular flow and substantial deviations from average reaction times.

In most finishers, the bulk of the polymer stands at the bottom of the vessel, and the revolving cage dips in and out of this pool to create newly exposed areas of polymer. Blades are sometimes used to spread the polymer along the cage and to urge it forward toward the exit end of the vessel. The temperature of the newly introduced partially polymerized material can, of course, be regulated, as can the average temperature points within the chamber. However, these methods of temperature control, while generally effective, do not provide a finite control at the particular points within the chamber where the most critical problem exists.

Temperature variations in these critical areas within the chamber have created difficulties in achieving a rapid and efficient production of a finished polymer with a minimum of degradation due to excessive tempertaure. A particularly severe limitation has been a lack of means for removing heat generated in situ by the mechanical work imparted from previously used film forming devices, particularly during synthesis of higher molecular weight and higher viscosity polymers.

SUMMARY OF THE INVENTION

Accordingly it is an object of this invention to provide a polymerization apparatus which promotes efficient removal of volatile by-products by the cooperation of rotor and stator surfaces.

A further object is to provide polymerization apparatus with either or both rotor and stator surfaces having finite temperature control means.

Another object of this invention is to provide a polymerization apparatus having temperature control means for either or both rotor and stator surfaces, means in conjunction therewith for efficiently transporting the polymerizing material from inlet to outlet end.

Other objects of the invention will become more readily apparent when read in conjunction with the following detailed description and drawings which show the apparatus of this invention.

Briefly, the objects of this invention are accomplished by providing liquid heat exchange media conduits in cooperating rotor and stator members of a polymerization apparatus, the members having configurations which are adaptable to the mixing and transporting of the polymer, as well as the containment of the heat exchange media conduits.

BRIEF DESCRIPTION OF THE DRAWING

FIG. 1 is a side elevation view partially broken away, of an example of a polymerization apparatus, or finisher, according to the instant invention.

FIG. 2 is a sectional view taken along line 2—2 of FIG. 1 showing an end view of a stator component of this invention.

FIG. 3 is a sectional view taken along line 3—3 of FIG. 1 showing a plan view of stator and rotor components of this invention.

DESCRIPTION OF THE PREFERRED EMBODIMENT

Figure 4:
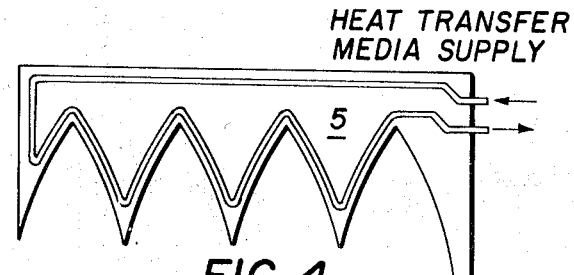
FIG. 4 is a schematic side elevation view of a variation of the stator component of the embodiment shown in FIG. 1 wherein it is provided with temperature control means.

Referring now in detail to FIG. 1, finisher 7 comprises a generally cylindrical finishing or reaction chamber 22 surrounded by heating jacket 23, and includes cage assembly 1 axially mounted on shaft 11, and a plurality of rotor members 2, having on the polymer entry side adjacent cage assembly 1, at least one stand pipe 3 with intermember flow ports 4 connecting each successive rotor member in such a manner as to permit the flow of a heat transfer medium from the proximal portion of the preceding member to the distal portion of the next succeeding member. Shaft 11 is provided with shaft supply line 13 and shaft return line 12, and is connected to rotary union 14 which provides source and return connections to rotating shaft 11. The heat transfer medium flows from shaft supply line 13 through shaft supply port 21 and stand pipe 3 to the interior of the first rotor member, and returns from the last rotor member through shaft return port 19. The heat transfer medium is circulated by pump 17, through heat exchange 15 to rotary union 14. The return line from rotary union 14 is directed to sump tank 16 which supplies pump 17.

At least one stator member 5 is mounted on the interior wall of chamber 22. In this particular example only one stator member is employed, this being in the upper portion of chamber 22, located in proximity to exhaust line 9. The longitudinal axis of stator member 5 is in an oblique position with respect to the axis of shaft 11, so disposed that the polymer entry end of stator member 5 is offset opposite the direction of rotation of rotor members 2, and the polymer exit end is offset in the direction of rotation of the rotor members. Stator member 5 is generally shaped to conform to the shape of rotor members 2, and disposed so as to permit free passage of the rotor members in their cycle of rotation with a clearance preferably of about $\frac{1}{16}''$ to about $\frac{1}{2}''$, thus causing a spreading of the polymer along the surface of the rotor members and a collection of the excess polymer along the surface of the stator member. The oblique position of the stator member with respect to the axis of rotation of the rotor members is such as to urge the polymer in a path along the outer surface of the rotor members, thus causing maximum exposure to temperature controlled surfaces in the course of the mixing process. As shown in FIG. 1, the temperature controlled rotor members and stator members occupy only a portion of the entire chamber 22. This portion may be greater or lesser, as desired, containing more or fewer rotor members than shown in FIG. 1; or cage 1 may be entirely omitted giving way to a full chamber of members such as 2 and 5. Cage assembly 1 in this example depicts schematically any conventional melt polymer finishing cage known to the art. This type of cage is usually provided with one or more cage type cylinders of mesh or grid, with screw or blade type polymer forwarding means. It may or may not be provided additionally with stator scraper blades to cause further mixing and spreading of the polymer as it progresses through the chamber.

The low molecular weight polymer is fed into supply line 8 and progresses along chamber 22, through cage assembly 1, over rotor members 2, until it reaches the surface of the last rotor member in a series, at which time the highly viscous high molecular weight polymer is deposited in the vicinity of discharge pump 6, at which point it is evacuated from the chamber.

Shaft 11 is designed to turn at speeds of from about .04 to 120 r.p.m. depending upon the diameter of the chamber and other fixed and variable conditions within the chamber, and the desired viscosity and molecular weight of the product.

FIG. 4 represents a permissible variation of stator member 5 of the embodiment shown in FIG. 1. Temperature control means may be provided for one or more of such stator members 5 in addition to or in lieu of temperature control means in rotor members 2.

An obvious variation not shown in the drawing involves a stator member having a cross-section similar to the shape of the stator member shown, but extending around a substantial portion of the inner wall of the vessel. The corresponding shaft mounted rotor element is in blade form, wiping the inner periphery of the stator member.

Figure 7:
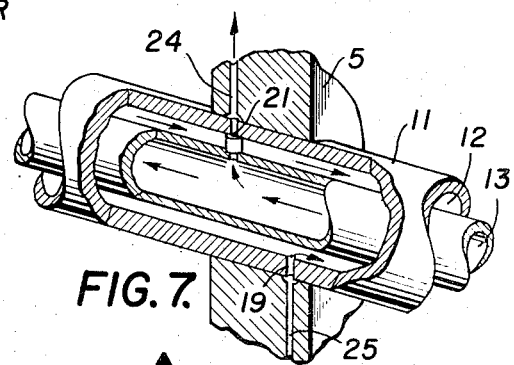
FIG. 7 is a perspective view showing a preferred method of temperature control media distribution from the shaft to the stator member of FIG. 5.
Figure 5:
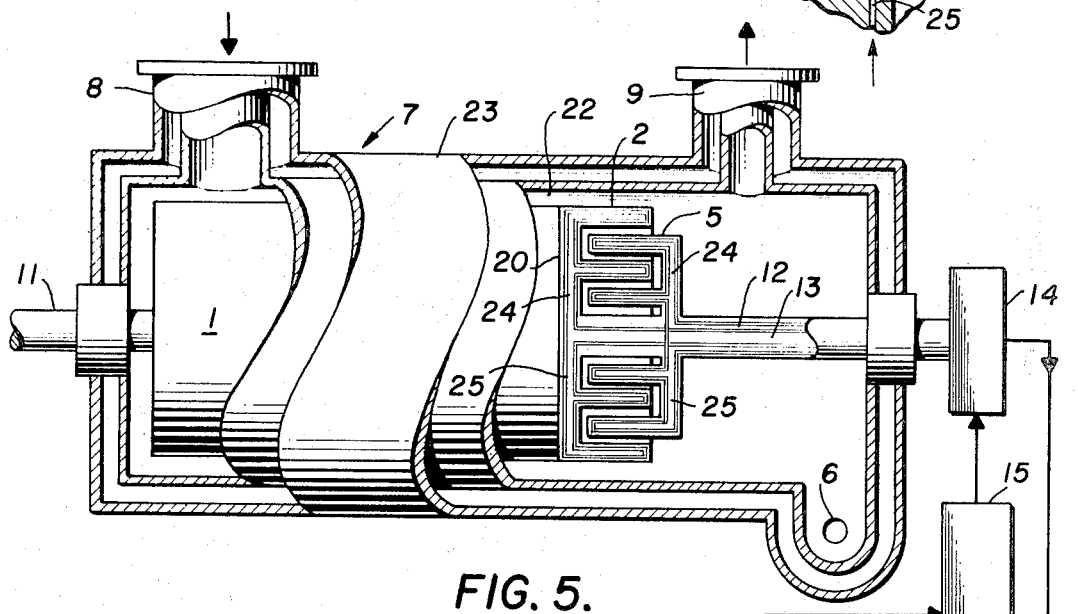
FIG. 5 is a side elevation view partially broken away, and partially schematically shown, of a second embodiment of this invention wherein another relationship of a stator surface to a rotor surface is shown.
Figure 6:
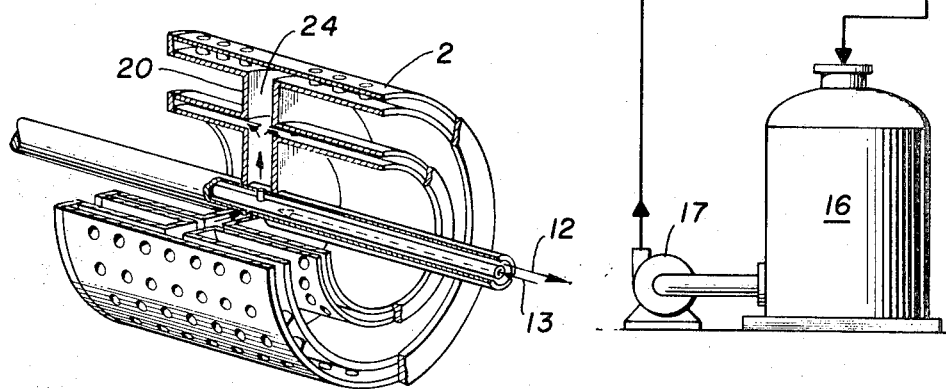
FIG. 6 is a schematic perspective view showing a method of temperature control media distribution to the rotor surface of the embodiment.

Referring now in detail to FIGS. 5, 6 and 7 showing a second preferred embodiment of this invention, with element numerals referring to elements equivalent or identical to those in FIG. 1, repetitive explanation being eliminated where unnecessary, means are provided in similar fashion for finite temperature control of rotor and stator surfaces. However, stator member 5, within which is rotatably mounted shaft 11, has finger-like projections extending between and in juxtaposition with corresponding projection of a segment of cage assembly 1, so that the shaft may turn with the rotor member, leaving stationery the stator member which is secured to the wall of chamber 22. Cage assembly 1, in this embodiment may consist of any number of corresponding rotor and stator members or, if preferred, a portion of cage assembly 1 may comprise any conventional finisher cage in conjunction with only one or two rotor and stator members. That portion of cage assembly 1 which, in this embodiment, includes rotor members in conjunction with stator members, preferably comprises a plurality of concentric cylindrical cages, coaxially mounted on shaft 11. They may be segmented so as to provide cooperating surface and space for a plurality of sets of interworking rotor and stator members. Stator members may be mounted on either the polymer receiving end or the polymer discharge end or both ends of a segment of the concentric cylindrical cages. They may include concentric projections fitting between and juxtaposed with the peripheral (meaning external end, inner and outer) surfaces of the rotor member; or as in the embodiment illustrated, may comprise finger-like concentric projections large enough, where desired, to include heat transfer medium conduits; but small enough to permit as many such projections as possible with intervening spaces for polymer flow. The shape of these projections may vary, and may provide by their configurations polymer forwarding means. In this embodiment they are raked at helic angles to define helically extending screw flight segments radially spaced about shaft 11. By this is meant that they are disposed, with relation to rotor member 2, in the manner described in U.S. Pat. 3,476,523, with particular reference to FIG. 5 thereof, and its description. Each cage of the stator member of this embodiment has a hollow inner core within which heat transfer medium is circulated and to which heat transfer medium is supplied through cage support members 20 from shaft 11. Return conduits are provided through corresponding conduits as shown in FIG. 6. Polymer forwarding means, if provided by other than the configuration of the finger-line projections of stator member 5, may be by gravity or of a screw, screw segment, or scraper blade variety, or any combination thereof. Cage assembly 1 is mounted on and rotates with shaft 11. Stator member 5 within which shaft 11 is rotatably mounted, is held in fixed position by a projection (not shown) from the wall of chamber 22. Rotor member 2 comprises the concentric projections of the ends of the cylindrical cages of finisher 1.

Shaft 11 is provided, as in FIG. 1, with shaft supply line 13 which circulates the heat transfer medium to stator member 5 and rotor member 2, as well as a return line 12. Shaft supply line 13 is tapped to provide shaft supply ports 21 providing heat transfer medium directly to stator member 5, and to rotor member 2 through cage support members 20. Within rotor member 2 heat transfer medium is circulated through supply lines 24 within cage support members 20, thence within the hollow inner cores of the concentric cages. Return lines 25, in other support members 20 complete the circulation. Stator member 5 is similarly provided with supply lines 24 and return lines 25. Shaft return ports 19 connect with corresponding return conduits in corresponding members.

As with the embodiment of FIG. 1, the low molecular weight polymer is fed into the chamber through supply line 8 and progresses through chamber 22.

After undergoing spreading and mixing between rotor and stator members it is discharged through discharge pump 6.

Where desirable in the type of embodiment shown in FIG. 5, stator member 5 may be made to rotate in a direction opposite to that of the rotor member or in either embodiments, the stator and rotor functions may be reversed simply by providing rotating means for the desired stator element and holding means for the described rotor element. The shape of stator members of either embodiment may be varied to increase the surface exposed to the rotor members as well as to better promote the progress of the polymer from the entry end to the exit end. As explained above the type of embodiment shown in FIG. 5 may include only one or a plurality of such combinations of stator and rotor members, in conjunction with segmented cage sections; and the stator fingers may be variously shaped, as, for example, they may be raked at helic angles to define helically extending screw flight segments radially spaced about shaft 11, thus providing more efficient mixing and temperature regulation as well as continuous flow. However, to the extent that projections of members of either embodiment are narrowed and curved it becomes increasingly impractical to include supply and return lines for the heat exchange media therein, and correspondingly more practical to include such lines in the opposing member. Although the reaction chambers of both preferred embodiments are described as generally cylindrical their shapes may vary considerably with oval, egg-shaped or pear shaped cross-sections providing polymer or by-product containing space outside of the area of the cage assembly.

It would thus be seen that the objects set forth above, among those made apparent from the preceeding description, are efficiently obtained and, since certain changes may be made in the above construction without departing from the scope of the invention, it is intended that all matter contained in the above description or shown in the accompanying drawing shall be interpreted as illustrative and not in a limiting sense.

Various changes and modifications may be made in practicing the invention without departing from the spirit and scope thereof, and therefor, the invention should not be limited except as defined in the appended claims.

We claim:

1. A polymerizer reactor comprising in combination:
   (a) a shaft rotating about its axis,
   (b) at least one rotor member fixedly mounted on said shaft,
   (c) at least one blade-like stator member having a polymer receiving end and a polymer discharge end mounted on a vessel wall so disposed as to be longitudinally oblique to the axis of said shaft, the polymer receiving end of said stator member being offset against the direction of rotation of said rotor member, and the polymer discharge end of said stator member being offset toward the direction of rotation of said rotor member, a substantial portion of the periphery of which stator member is shaped to conform to and juxtaposed with a substantial portion of the periphery of said rotor member.
   (d) a generally cylindrical vessel including said vessel wall surrounding the outermost of said rotor and stator members,
   (e) finite temperature control means for the ambient area of said rotor and stator members.
   (f) means for introducing polymerizable material into said vessel, and
   (g) means for recovering polymerized material from said vessel.

2. The polymerizer reactor of claim 1 wherein said finite temperature control means comprises fluid heat transfer medium supply and return conduits whereby a heat transfer medium is circulated near the peripheral surface of at least one of said rotor and stator members, a heat transfer medium supply source, and temperature control means for said heat transfer medium.

3. The polymerizer reactor of claim 2 wherein said conduits extend to within said rotor member.

4. The polymerizer reactor of claim 2 wherein said conduits extend to within said stator member.

5. The polymerizer reactor of claim 2 wherein said conduits extend to within said rotor member and said stator member.

6. The polymerizer reactor of claim 2 wherein said finite temperature control means comprises fluid heat transfer medium supply and return conduits extending through said shaft to the interior of one of said rotor members, thereafter to each successive rotor member whereby a heat transfer medium is circulated near the peripheral surface of said rotor member, a heat transfer medium supply source, and temperature control means for said heat transfer medium.

7. A polymerizer reactor comprising in combination:
   (a) a shaft rotating about its axis,
   (b) at least one rotor member comprising at least a segment each of a plurality of perforated hollow core cylinders being concentric with and surrounding a portion of said shaft,
   (c) means for coaxially supporting said perforated cylinders on said shaft,
   (d) at least one stator member rotatably mounted on said shaft, a substantial portion of the periphery of which is shaped to conform and juxtaposed with a substantial portion of the periphery of an end of said rotor member,
   (e) a vessel including a generally cylindrical wall surrounding the outermost of said rotor and stator members,
   (f) means extending from said vessel wall to secure said stator blade,
   (g) finite temperature control means for the ambient area of said rotor and stator members,
   (h) means for introducing polymerizable material into said vessel,
   (i) means for recovering polymerized material from said vessel, and,
   (j) means for conveying said material within said vessel from the locale of said introducing means to the locale of said recovering means.

8. The polymerizer reactor of claim 7 wherein said temperature control means comprises fluid heat transfer medium supply and return conduits whereby a heat transfer medium is circulated near the peripheral surface of at least one of said members, and temperature control means for said heat transfer medium.

9. The polymerizer reactor of claim 8 wherein said conduits extend to within said rotor member.

10. The polymerizer reactor of claim 8 wherein said conduits extend to within said stator member.

11. The polymerizer reactor of claim 8 wherein said conduits extend to within said rotor member and to within said stator member.

12. The polymerizer reactor of claim 7 wherein said finite temperature control means comprises fluid heat transfer medium supply and return conduits extending through said shaft and said supporting means for said perforated cylinders to said rotor member, a heat transfer medium supply source, and temperature control means for said heat transfer medium, whereby a heat transfer medium of controlled temperature is circulated near the peripheral surface of said rotor blade and said stator blade.

13. The polymerizer reactor of claim 7 wherein said stator member has fingers raked at helic angles to define helically extending screw flight segments radially spaced about said shaft, whereby said stator fingers provides conveying means for said material through a portion of said vessel.

14. A polymerizer reactor comprising in combination:
   (a) a shaft rotating about its axis,
   (b) a vessel including a generally cylindrical wall generally coaxial with said shaft,
   (c) at least one stator member mounted on said vessel wall having a radially unequal inner peripheral surface generally facing said shaft, and generally circular cross sections,
   (d) at least one blade-like rotor member fixedly mounted on said shaft having a polymer receiving end and a polymer discharge end so disposed as to be longitudinally oblique to the axis of said shaft, the polymer receiving end of said stator member being offset toward the direction of its rotation and the polymer discharge end of said rotor member being offset away from the direction of its rotation, a substantial portion of the periphery of which rotor member is shaped to conform to and juxtaposed with a substantial portion of the inner external surface of said stator member,
(e) finite temperature control means for the ambient area of said rotor and stator members,
(f) means for introducing polymerizable material into said vessel, and
(g) means for recovering polymerized material from said vessel.

15. The polymerizer reactor of claim 14 wherein said temperature control means comprises fluid heat transfer medium supply and return conduits whereby a heat transfer medium is circulated near the peripheral surface of at least one of said members, and temperature control means for said heat transfer medium.

16. A polymerizer reactor comprising a combination:
(a) a shaft rotating about its axis,
(b) a stator member comprising at least a segment each of a plurality of perforated cylinders being concentric with and surrounding a portion of said shaft,
(c) means for supporting said perforated cylinders coaxially about said shaft,
(d) at least one rotor member fixedly mounted on said shaft, a substantial portion of the periphery of which is shaped to conform and juxtaposed with a substantial portion of the periphery of an end of a segment of said stator member,
(e) a vessel including a generally cylindrical wall surrounding the outer most of said rotor and stator members,
(f) means extending from said vessel wall to secure said stator member,
(g) finite temperature control means for the ambient area of said rotor and stator members,
(h) means for introducing polymerizer material into said vessel,
(i) means for recovering polymerized material from said vessel, and
(j) means for conveying said material within said vessel from the locale of said introducing means to the locale of said recovering means.

17. The polymerizer reactor of claim 16 wherein said temperature control means comprises fluid heat transfer meidum supply and return conduits whereby a heat transfer medium is circulated near the peripheral surface of at least one of said members, and temperature control means for said heat transfer medium.

18. A polymerizer reactor comprising in combination:
(a) a generally horiontal extending shaft rotating about its axis,
(b) a least one rotor member comprising at least a segment each of a plurality of perforated cylinders being concentric with and surounding a portion of said shaft,
(c) means for coaxially mounting said segmented perforated cylinders on said shaft,
(d) at least one opposing rotor member mounted on said shaft, a substantial portion of the periphery of which is shaped to conform and juxtaposed with a substantial portion of the periphery of an end of said rotor member,
(e) a vessel including a generally cylindrical wall surrounding the outer most of said rotor members,
(f) rotation means whereby said rotor member and said opposing rotor member are rotated in opposite directions,
(g) finite temperature control means for the ambient area of said rotor and stator members,
(h) means for introducing polymerizable material into said vessel,
(i) means for recovering polymerized material from said vessel, and
(j) means for conveying said material from the locale of said introducing means to the locale of said recovering means.

19. The polymerizer reactor of claim 18 wherein said temperature control means comprises fluid heat transfer medium supply and return conduits whereby a heat transfer medium is circulated near the peripheral surface of at least one of said rotor members, and temperature control means for said heat transfer medium.

References Cited
UNITED STATES PATENTS

| 3,199,960 | 8/1965 | Sowerby | 23—285 |
| 3,391,733 | 7/1968 | Stevens | 165—86 |

JAMES H. TAYMAN, Jr., Primary Examiner

U.S. Cl. X.R.

23—252; 165—86, 88, 92; 260—95, 78; 259—9, 10